United States Patent
Belmonte et al.

(10) Patent No.: US 7,127,128 B2
(45) Date of Patent: Oct. 24, 2006

(54) ELECTRO-OPTICAL DEVICE

(75) Inventors: Michele Belmonte, Milan (IT); Valerio Pruneri, Milan (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 11/070,931

(22) Filed: Mar. 3, 2005

(65) Prior Publication Data

US 2006/0198581 A1    Sep. 7, 2006

(51) Int. Cl.
*G02F 1/035* (2006.01)
*G02B 6/10* (2006.01)
(52) U.S. Cl. ............................. 385/2; 385/40; 385/129
(58) Field of Classification Search ................ 385/1–3, 385/129–132
See application file for complete search history.

(56) References Cited

U.S. PATENT DOCUMENTS

| | | | |
|---|---|---|---|
| 6,091,864 A * | 7/2000 | Hofmeister | 385/2 |
| 6,449,080 B1 * | 9/2002 | McBrien et al. | 359/245 |
| 6,763,151 B1 * | 7/2004 | Bosso et al. | 385/3 |
| 2004/0247225 A1 * | 12/2004 | Tavlykaev | 385/8 |
| 2006/0023288 A1 | 2/2006 | McBrien et al. | |

* cited by examiner

*Primary Examiner*—John D. Lee
(74) *Attorney, Agent, or Firm*—Patterson & Sheridan, LLP (57) ABSTRACT

Accordingly, a preferred embodiment of the present invention comprises an electro-optical device having an optical waveguide that includes two optical pathways, wherein the optical waveguide is embedded within the substrate. A bias electrode layer is formed on the surface of the substrate. A buffer layer is formed on at least a portion of the bias electrode layer and the surface of the substrate. An RF electrode layer is formed on the buffer layer. A bias-tee electrically couples the bias electrode layer and the RF electrode layer.

18 Claims, 6 Drawing Sheets

ELECTRO-OPTICAL DEVICE

BACKGROUND OF THE INVENTION

1. Field of the Invention

The present invention relates generally to electro-optical devices, and more specifically to electro-optical devices suitable for phase/intensity modulation and switching.

2. Description of the Related Art

Phase/intensity modulators and switches using an electro-optic material are in common use in the Telecom industry. An optical-electrical device, such as a Mach-Zehnder interferometer, can be used to bias an optical signal. These devices are typically driven by both a bias voltage, which sets the operating point, and an RF voltage, which is responsible for the actual modulation.

Figure 1A:
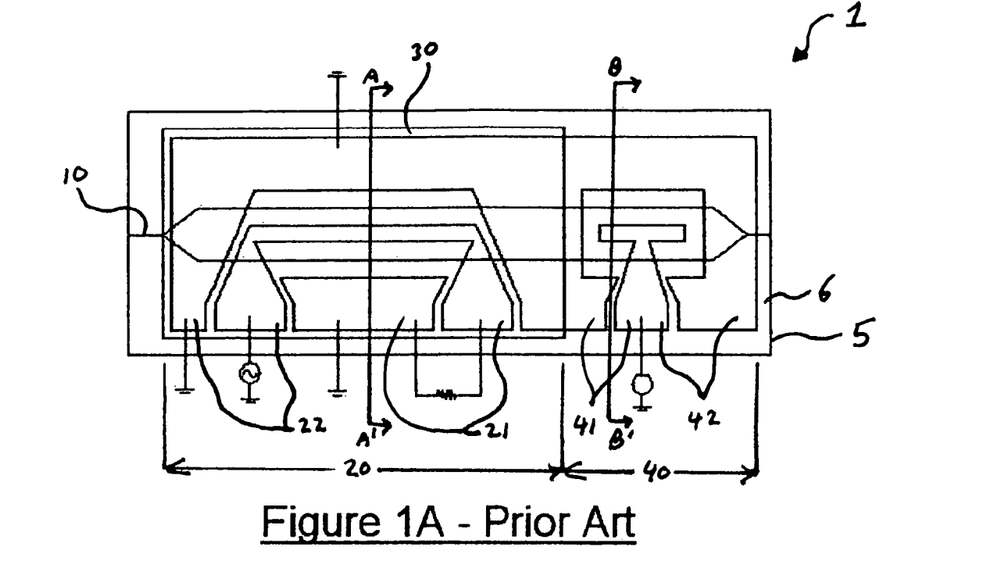
FIGS. 1A–1C shows a prior-art electro-optical device.

FIG. 1A shows a first prior-art Mach-Zehnder type electro-optical device 1. An optical waveguide 10 is embedded in the top surface 6 of a substrate 5. The substrate 5 is an x-cut LiNbO3 material. The optical waveguide 10 forks into two parallel optical pathways which later rejoin into a single optical pathway. The active regions of the electro-optical device, where the optical pathways are exposed to electromagnetic fields, are divided between a RF electrode region 20 and a bias electrode region 40. In the RF electrode region 20 two pairs of RF electrodes 21, 22, extend between and along the outside of the parallel optical pathways. The RF electrodes are made of metal and are separated from the substrate by a dielectric buffer layer 30. The RF electrodes are connected to a high-frequency power source.

In the bias electrode region 40 two pairs of bias electrodes 41, 42, extend between and along the outside of the parallel optical pathways. The bias electrodes are made of metal and are applied directly on top of the substrate (no buffer layer). The bias electrodes are connected to a DC or low-frequency power source.

Figure 1B:
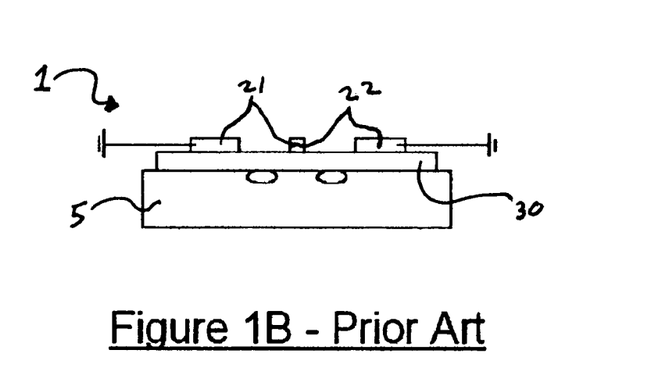
Figure 1C:
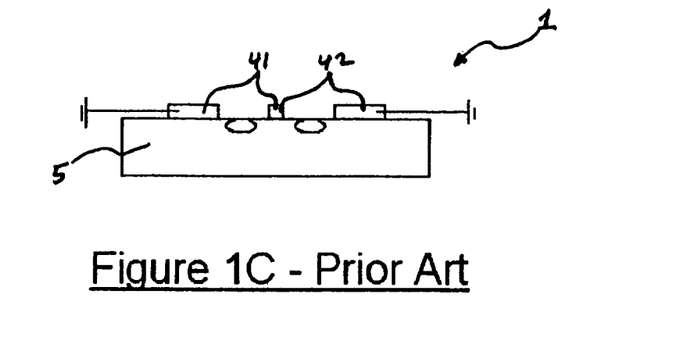

FIGS. 1B and 1C show a vertical build-up of the electro-optical device 1 of FIG. 1A, sectioned along A–A' and B–B', respectively. The buffer layer 30 is often made of SiO2 and is placed between the substrate 5 and pairs of RF electrodes 21, 22 (FIG. 1B), to achieve velocity matching between the high-frequency electromagnetic fields and optical fields. This buffer layer is absent in the bias electrode region 40 (FIG. 1C), because the presence of a dielectric layer between bias electrodes and LiNbO$_3$ substrate is known to be the main cause of long term (bias) drift. Thus, with this configuration, long-term drift is minimized, however, the optical Mach-Zehnder structure in the present example must be overly long to accommodate the two sets of electrodes.

Alternate prior art devices combine the bias and RF electrodes onto a common set of electrodes. To ensure electrical independence between bias and RF electrodes, an external electrical circuit (bias tee) is generally used. With this approach, the structure is shorter that the prior-art device of FIGS. 1A–C, since no additional space is required for a separate bias electrode. Unfortunately, with this design it is not possible to avoid the having the buffer layer underneath the bias electrode, which is disadvantageous in terms of long-term (bias) drift. Further, positioning the bias electrode on top of the buffer layer increases the distance between the electrodes and the optical waveguides, reducing the efficiency of the system and making it unsuitable for high-efficiency applications.

Therefore, there exists a need for an electro-optical device for phase/intensity modulation and switching with improved efficiency, operation, and reduced size.

SUMMARY OF THE INVENTION

Accordingly, a preferred embodiment of the present invention comprises an electro-optical device that includes a substrate, an optical waveguide embedded within the substrate and having a first optical pathway and a second optical pathway, a bias electrode layer formed on a surface of the substrate, a buffer layer formed on at least a portion of the bias electrode layer and the surface of the substrate, an RF electrode layer formed on the buffer layer, and a bias-tee electrically coupling the bias electrode layer and the RF electrode layer.

One advantage of the disclosed electro-optical device is that the design effectively eliminates the long-term drift effect found in prior art devices. Another advantage is that certain elements of the disclosed device are positioned relative to one another such that spacing between the elements as well as the overall length of the device are reduced, resulting in a more efficient design that, among other things, requires less operating power relative to prior art devices.

DETAILED DESCRIPTION

Figure 2A:
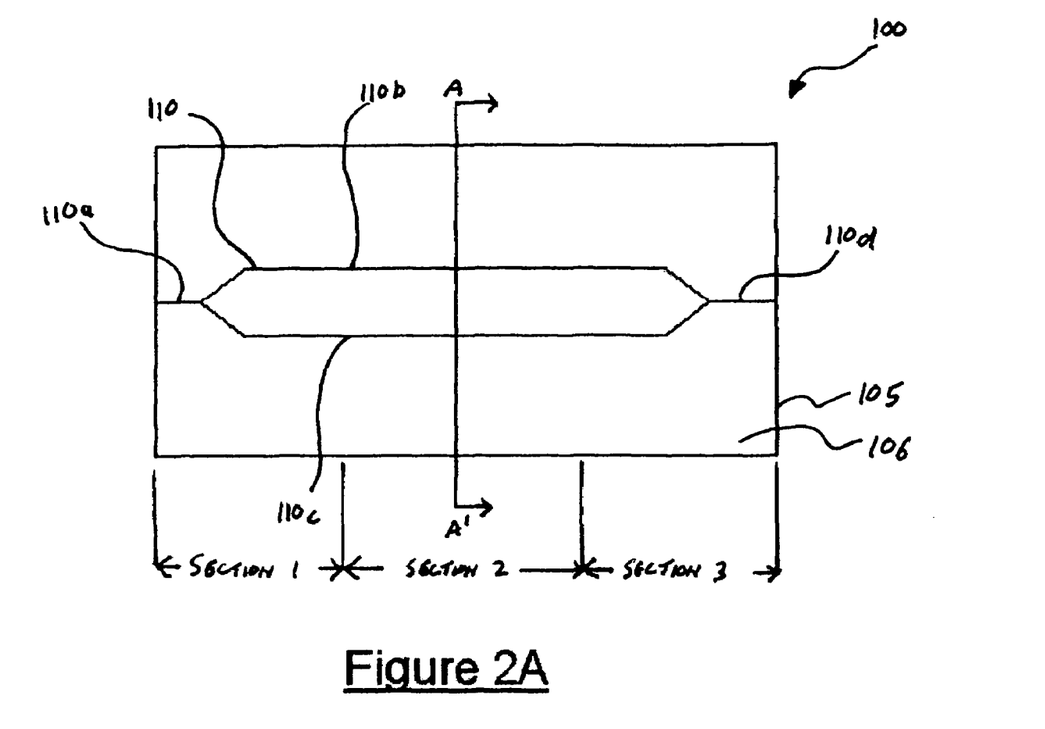
FIG. 2A shows an electro-optical device having a substrate and embedded waveguides, according to one embodiment of the present invention.

Referring now to FIG. 2A, there is shown an electro-optical device 1 having a substrate 5 with an embedded optical waveguide 10 relative to the corresponding top surface 6. The optical waveguide 10 is divided into 3-sections. In Section 1, the optical waveguide 10 includes a linear portion having a single optical pathway 10a, which forks into two parallel optical pathways 10b, 10c. Section 2 includes the two parallel optical pathways 10b, 10c traversing laterally across the substrate 5 relative to the top surface 6. In Section 3, the parallel optical pathways 10b, 10c converge to reform a single optical pathway 10d. The substrate 5 is formed of a suitable material such as Libnium Niobate (LiNbO3). The optical waveguide 10 is formed of a suitable material having an optical field that is sensitive to, or can be manipulated by, and electromagnetic field. Though FIG. 2A shows an x-cut LiNbO3, the present invention may be applied to other material cuts as well.

Figure 2B:
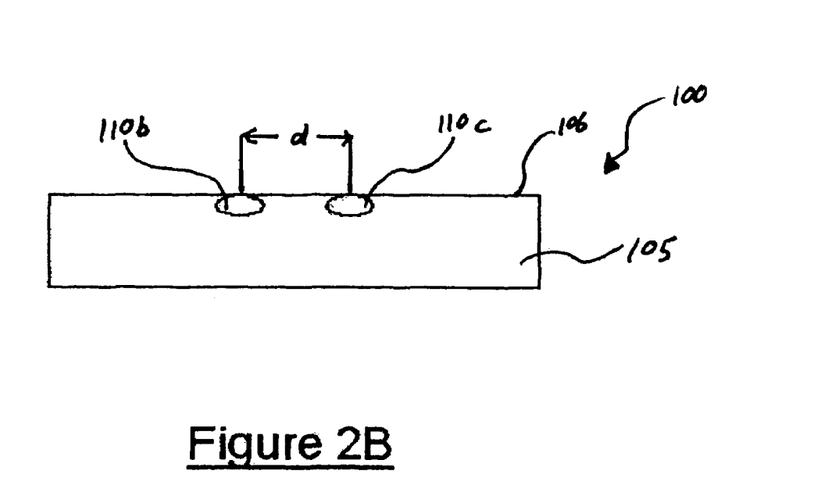
FIG. 2B shows a cross-section of FIG. 2A.

FIG. 2B shows a cross-section of FIG. 2A taken along the line A–A'. The two parallel optical pathways 10b, 10c are shown embedded within the substrate 5 relative to top surface 6. The parallel optical pathways are separated by a distance, d.

Figure 3A:
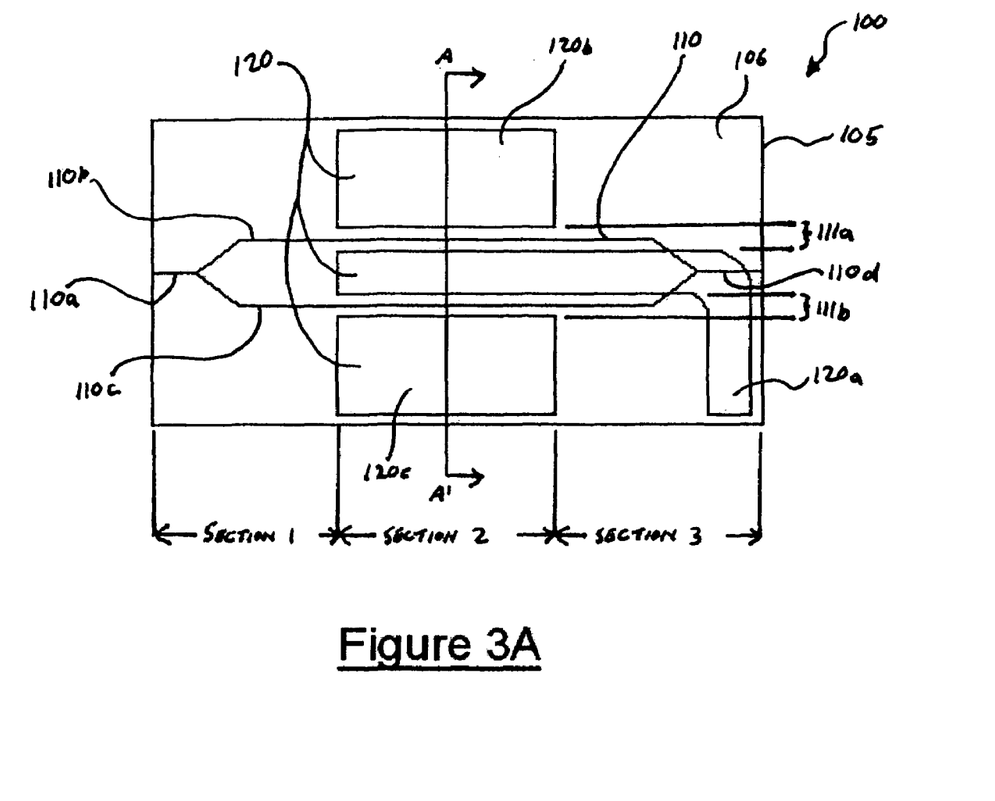
FIG. 3A shows a bias electrode layer added to the electro-optical device of FIG. 2A, according to one embodiment of the present invention.

Referring now to FIG. 3A, there is shown the electro-optical device 1 having a bias electrode layer 20 formed on the top surface 6 of the substrate 5 of FIG. 2A. The bias electrode layer 20 includes a power bias electrode 20a and two ground bias electrodes 20b, 20c. The powered and ground bias electrodes form two bias electrode pairs sharing a common powered bias electrode. The bias electrode layer 20 is made of a semi-conductive material such as Indium Oxyde, behaving like a conductor in low-frequency regime and like a dielectric in a high-frequency regime, with a typical thickness between 20 and 2000 nanometers. One of ordinary skill in the art will recognize that the bias electrode layer could also me made of any material showing semi-conductive properties, although, materials transparent at the wavelength of the optical signal and showing a refractive index lower than that of LiNbO3 are preferred.

The power bias electrode 20a is positioned on the top surface 6 between the parallel optical pathways 10b, 10c in Section 2. A portion of the power bias electrode 20a is shown extending beyond Section 2 and into Section 3, thus partially overlapping the optical waveguide 10 in Section 3. The extended portion of the powered bias electrode 20a is used for electrical coupling to a power supply.

The two ground bias electrodes 20b, 20c are positioned on the top surface 6 relative to Section 2, spaced on either side of the power bias electrode 20a. As such, gaps 11a, 11b, are present between the two bias electrode pairs at a location above the parallel optical pathways 10b, 10c in Section 2.

Figure 3B:
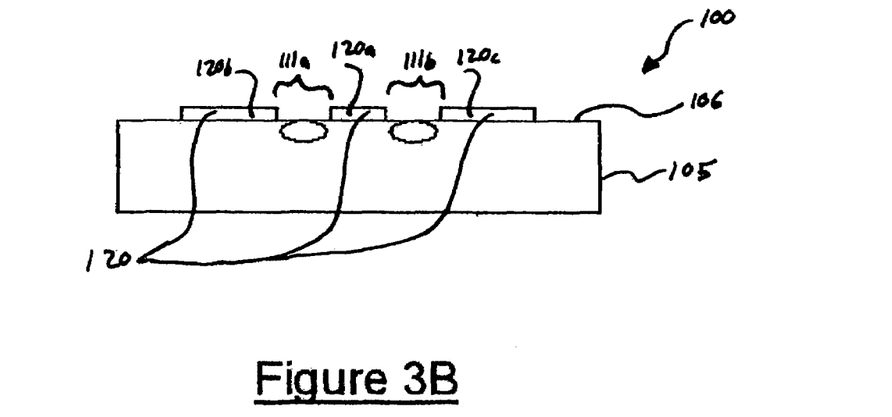
FIG. 3B shows a cross-section of FIG. 3A.

FIG. 3B shows a cross-section of FIG. 3A taken along the line A–A'. The figure shows a vertical build-up of the bias electrode layer 20 on the top surface 6 of substrate 5. Gaps 11a, 11b separate the powered bias electrode 20a from the ground bias electrodes 20b, 20c. The gaps 11a, 11b overlap the location of the optical pathways 10b, 10c.

Figure 4A:
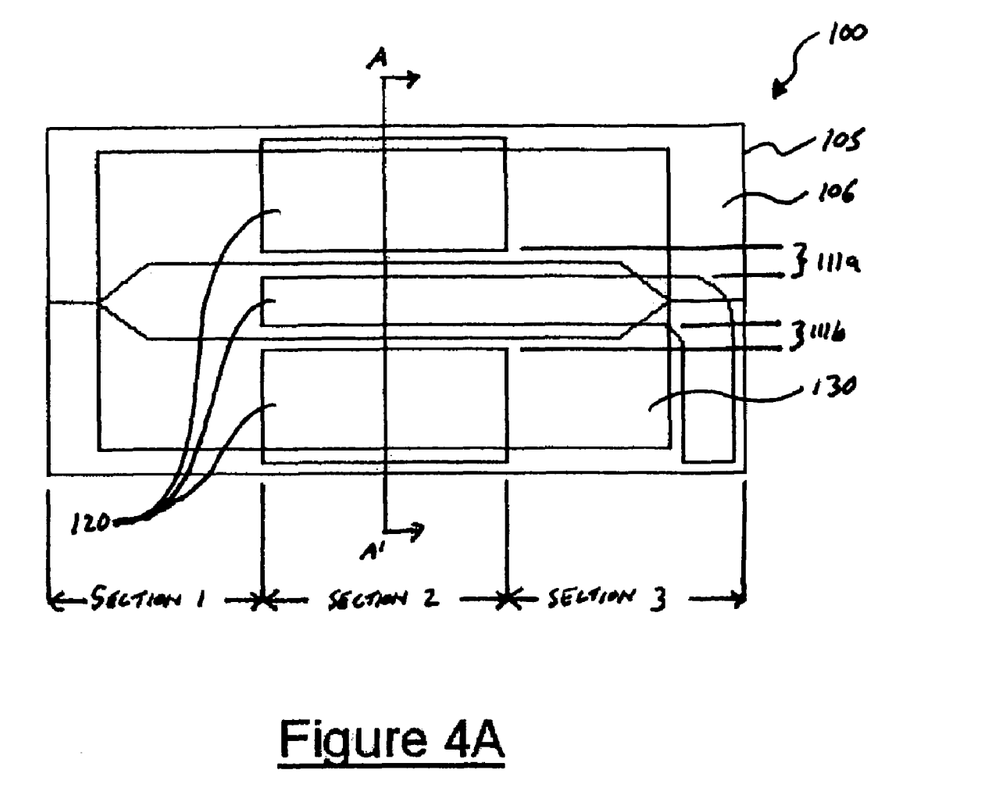
FIG. 4A shows a buffer layer added to the electro-optical device of FIG. 3A, according to one embodiment of the present invention.

Referring now to FIG. 4A, there is shown the electro-optical device 1 having a buffer layer 30 formed on the bias electrode layer 20 and the top surface 6 of the substrate 5 of FIG. 3A. The buffer layer 30 fills the gaps 11a, 11b between the bias electrode pairs and covers the bias electrode layer 20 at least in the region of Section 2. The buffer layer 30 should cover the bias power electrode and may not cover the entire bias electrode layer.

The buffer layer is made of a dielectric material such as SiO2 having a typical thickness in the range 100 to 2000 nm. One of ordinary skill in the art will recognize that the bias electrode layer could also me made of other dielectric materials showing low losses and low permittivity in the microwave frequency region.

Figure 4B:
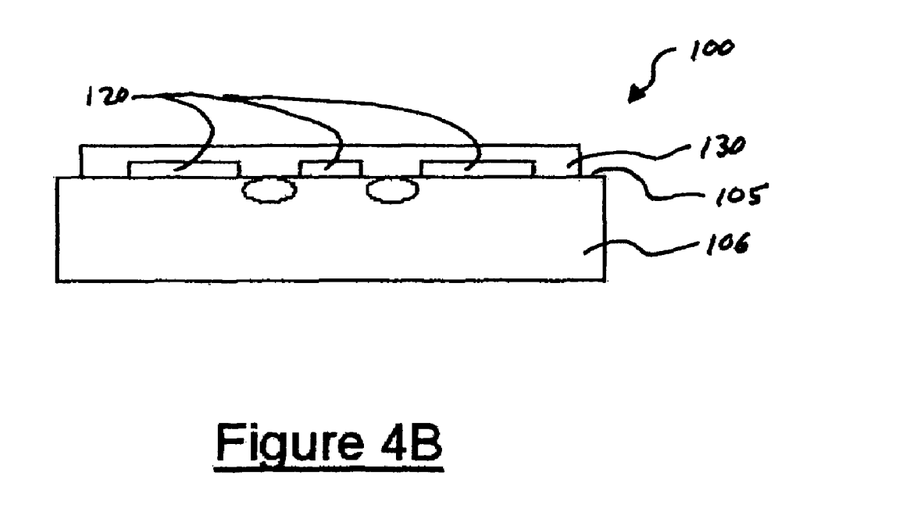
FIG. 4B shows a cross-section of FIG. 4A.

FIG. 4B shows a cross-section of FIG. 4A taken along the line A–A'. The figure shows a vertical build-up of the buffer layer 30 on top of the bias electrode layer 20 and the top surface 6 of substrate 5.

Figure 5A:
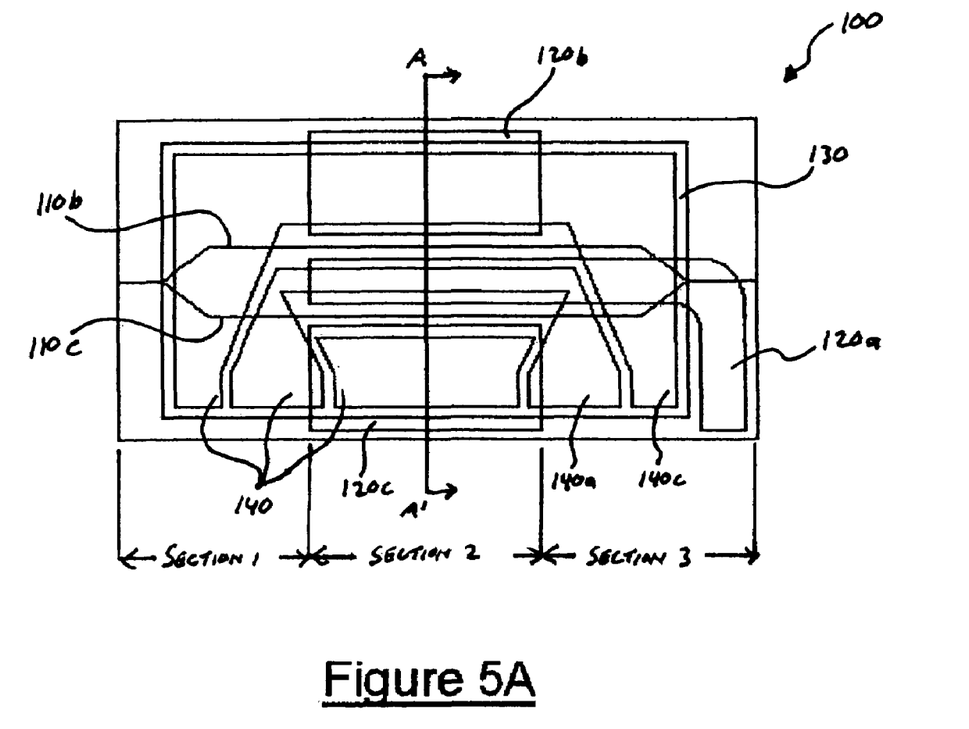
FIG. 5A shows a RF electrode layer added to the electro-optical device of FIG. 4A, according to one embodiment of the present invention.

Referring now to FIG. 5A, there is shown the electro-optical device 1 having a RF electrode layer 40 formed on the buffer layer 30 of FIG. 4A. The RF electrode layer 40 includes a power RF electrode 40a and two ground RF electrodes 40b, 40c. The RF electrode layer 40 is made of a metal such as gold and a typical thickness in the range 5 to 50 microns. One of ordinary skill in the art will recognize that the RF electrode layer could also me made of other materials showing good conduction in the microwave frequency range.

The power RF electrode 40a is positioned on the buffer layer 30 between the parallel optical pathways 10b, 10c, in Section 2. The power RF electrode 40a also generally overlaps the power bias electrode 20a in Section 2. Portions of the power RF electrode 40a are shown extending beyond the region between the parallel optical pathways 10b, 10c, thus partially overlapping a portion of the optical waveguide in these sections. The extended portions of the power RF electrode 40a are used for electrical coupling to a power supply.

The two ground RF electrodes 40b, 40c are positioned on the buffer layer 30 in Section 2, spaced on either side of the power RF electrode 40a. The ground RF electrodes 40b, 40c, also generally overlap the ground bias electrodes 20b, 20c in Section 2. The ground bias electrodes 20b, 20c and ground RF electrodes 40b, 40c may also be in contact with one another or be constituted by the same electrode.

Figure 5B:
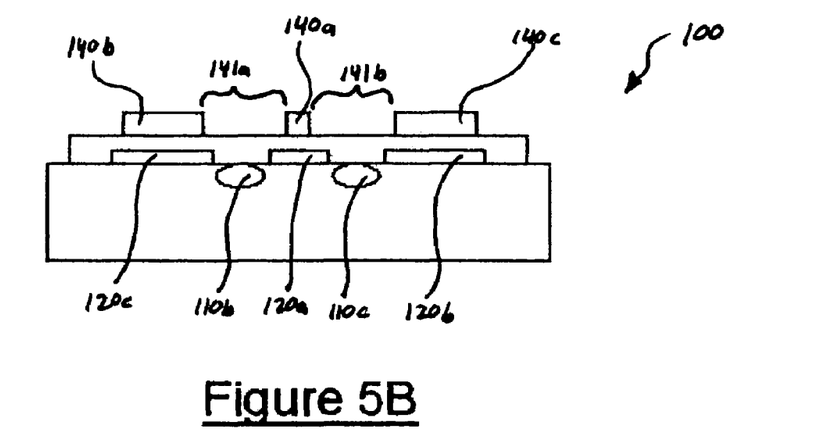
FIG. 5B shows a cross-section of FIG. 5A.

FIG. 5B shows a cross-section of FIG. 5A taken along the line A–A'. The figure shows a vertical build-up of the RF electrode layer 40 on the buffer layer 30. Gaps 41a, 41b separate the power RF electrode 40a from the ground RF electrodes 40b, 40c. The gaps 41a, 41b overlap the location of the optical pathways 10b, 10c.

Figure 6:
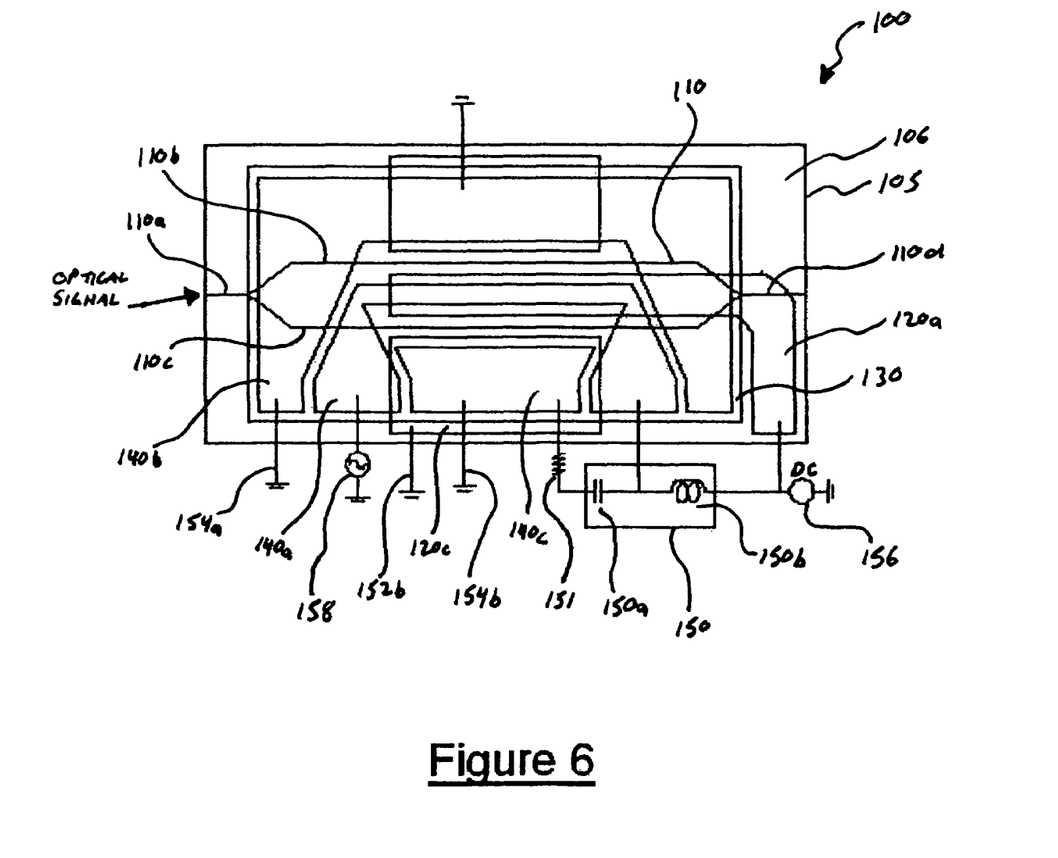
FIG. 6 shows the electro-optical device of FIG. 5A with electrical connections, according to one embodiment of the present invention.

Turning now to FIG. 6, the electro-optical device 1 of FIG. 5A is shown with electrical connections. The ground bias electrodes 20b, 20c, and the ground RF electrodes 40b, 40c are electrically coupled to grounds 52a, 52b, 54a, 54b, respectively. The power bias electrode 20a is electrically coupled to a DC power source 56. The power RF electrode 40a is electrically coupled to a variable voltage source 58. A bias-tee 50 electrically couples the power bias electrode 20a, power RF electrode 40a, and the ground RF electrode 40c. The bias-tee 50 includes an inductor 50b and a capacitor 50a. The inductor 50b separates the power RF electrode 40a from the DC power source 56. The capacitor 50a separates the power RF electrode 40a from the ground RF electrode 40c. A resister 51 also separates the power RF electrode 40a from the ground RF electrode 40c. The resistor is a chip resistor that terminates the RF line.

Note that the bias-tee 50 is present for the following reason. Consider the vertical geometry of the optical device of FIG. 5B. The powered bias electrode 20a is separated from powered RF electrode 40a by the buffer layer 30. The bias-tee 50 ensures that these two electrodes are maintained at the same DC voltage to avoid any significant electrical DC field build up across the buffer layer. In fact, even a low DC voltage difference could give rise to a very large electrical field (potentially leading to breakdowns) due to the thinness of the buffer layer 30 (typically less than 2 μm).

In the absence of a bias-tee 50, one would need to place very tight requirements on the buffer layer 30 in terms of resistivity, resistance to field-induced electrical breakdown and minimum thickness. This would in turn place limitations on the materials of possible use for the buffer layer 30 and on the design of the electro-optic device geometry, since the buffer layer thickness is typically one of the parameters that a designer would likely use as degree of freedom to optimize the electro-optic device structure.

In a preferred embodiment of the present invention, the electro-optical device 1 functions as a phase/intensity modular (or switch) using a Mach-Zehnder Interferometer configuration. An optical signal travels along the optical pathway 10a of optical waveguide 10, entering the substrate 5 in Section 1. The optical signal is then split into the two parallel optical pathways 10b, 10c. The optical signal continues laterally across the substrate 5 along the two parallel optical pathways 10b, 10c in Section 2. In Section 3, the two parallel optical pathways 10b, 10c rejoin to form a single optical pathway 10d.

The electro-optical device 1 is driven by both a bias voltage and an RF voltage. The bias voltage sets the operating point, whereas the RF voltage is responsible for the actual modulation.

The bias electrode layer 20 is formed directly on the top surface 6 of the substrate 5. As will be apparent to one of ordinary skill in the art, applying the bias electrode layer 20 directly on the top surface 6 of the substrate 5 minimizes or eliminates the so-called long-term drift effect. Further, the bias electrode layer 20 is comprised of a semi-conductor material. The semi-conductor material is chosen such that it is conductive in the operating range of the bias electrode, and effectively dielectric in the operating range of the RF electrode. This will be discussed in greater detail below.

Placing the bias electrode layer 20 directly on the top surface 6 of the substrate 5 minimizes the vertical distance between the bias electrodes 20a, 20b, 20c and the parallel optical pathways 10b, 10c. This constitutes an improvement in efficiency of the present invention over comparable prior-art systems, wherein the bias electrode layer is spaced from the top surface of the substrate by an additional layer. Reduced spacing between the bias electrodes and the optical pathways results in lower required operating power and improved efficiency.

The buffer layer 30 is placed between the RF electrode layer 40 and substrate 5 to achieve velocity matching between the microwave and optical fields. The buffer layer 30 is not present between the bias electrode layer 20 and the substrate 5, as it is known to be a significant cause of long term (bias) drift.

The RF electrode layer 40 is formed over the buffer layer 30. The RF electrode layer 40 may be formed via common processes as known in the art and, for instance, be comprised of a metal. The material is selected such that it is a suitable conductor in the operating range of the RF electrodes. The RF electrodes are vertically positioned generally over the bias electrodes, thus providing a compact footprint for the electro-optical device.

The RF electrodes of a Mach-Zehnder Interferometer typically operate at a high-frequency (microwave), whereas the bias electrodes typically operate at a DC or low-frequency. As the bias electrodes of the present invention are formed of a semi-conductive material that is dielectric in the operation range of the RF electrodes, the bias electrodes are effectively transparent to the electromagnetic field generated by the RF electrodes. However, the bias electrodes are conductors in their own operating range, and can therefore generate their own low-frequency electromagnetic field.

As shown in FIG. 6, the bias electrodes 20a, 20b, 20c are positioned to induce a DC or low-frequency electromagnetic field upon the optical pathways 10b, 10c. The RF electrodes 40a, 40b, 40c, are positioned to induce a high-frequency electromagnetic field upon the optical pathways 10b, 10c. Further, the RF electrodes overlap the bias electrodes, minimizing the required length of the electro-optical device.

The semiconductor used for the bias electrode of the present invention may be chosen with an appropriate refractive index and optical absorption so as to have a minimal influence on the optical effects within the optical waveguide, and induce little optical loss even when the electrode is placed very close to the optical waveguide. This is clearly not possible utilizing metal electrodes, which are known to induce high loss when located near the optical waveguides. Thus, with the present invention, the bias electrode may be placed (laterally) closer to the optical waveguides, reducing the required gap between the electrodes and consequently improving the efficiency of this invention with respect to prior art solutions employing metal bias electrodes.

The electro-optical device of the present invention may be used in other configurations and applications as well. For example, it may be desirable to employ only a single pair of bias and RF electrodes to influence the optical waveguides, rather than two pairs. The present invention could also be applied to other Mach-Zehnder configurations, such as those with couplers rather than Y-junctions. Further still, the geometry of the optical waveguide pathways and electrodes may be altered without departing from the scope of the present invention.

While several embodiments according to the present invention have been disclosed, one of ordinary skill in the art will appreciate that these embodiments are illustrative only, and not exhaustive. As such, the scope of the invention should be determined with respect to the appended claims.

We claim:

1. An electro-optical device comprising,
   a substrate;
   an optical waveguide embedded within said substrate, said optical waveguide further comprising a first optical pathway and a second optical pathway;
   a bias electrode layer formed on said substrate;
   a buffer layer formed on at least a portion of said bias electrode layer and said substrate;
   a RF electrode layer formed on said buffer layer; and
   a bias tee electrically couples said bias electrode layer and said RF electrode layer.

2. The electro-optical device of claim 1, wherein said first optical pathway is substantially parallel to and spaced apart from said second optical pathway.

3. The electro-optical device of claim 2, wherein said first optical pathway and said second optical pathway are formed of an optical material having an optical field that can be manipulated by an electromagnetic field.

4. The electro-optical device of claim 1, wherein said bias electrode layer further comprises at least one power bias electrode and at least one ground bias electrode.

5. The electro-optical device of claim 4, wherein said at least one power bias electrode is positioned between said first optical pathway and said second optical pathway.

6. The electro-optical device of claim 4, wherein said at least one power bias electrode is electrically coupled to a low-frequency power source.

7. The electro-optical device of claim 1, wherein said bias electrode layer is comprised of a semi-conductor.

8. The electro-optical device of claim 7, wherein said semi-conductor conducts electricity at low-frequencies and is a dielectric at high-frequencies.

9. The electro-optical device of claim 7, wherein said bias electrode layer generates a low-frequency electromagnetic field within at least one of said first optical pathway and said second optical pathway.

10. The electro-optical device of claim 7, wherein said semi-conductor has a higher index of refraction than said optical waveguide.

11. The electro-optical device of claim 1, wherein said buffer layer is comprised of a dielectric material.

12. The electro-optical device of claim 4, wherein said RF electrode layer further comprises at least one power RF electrode and at least one ground RE electrode.

13. The electro-optical device of claim 12, wherein said at least one power RF electrode is positioned between said first optical pathway and said second optical pathway.

14. The electro-optical device of claim 13, wherein said at least one power RF electrode is positioned over said at least one power bias electrode.

15. The electro-optical device of claim 12, wherein said at least one ground RF electrode further comprises said at least one ground bias electrode.

16. The electro-optical device of claim 12, wherein said at least one power RF electrode is electrically coupled to a high-frequency power source.

17. The electro-optical device of claim 16, wherein said RF electrode layer generates a high-frequency electromagnetic field within at least one of said first optical pathway and said second optical pathway.

18. The electro-optical device of claim 1, wherein said RF electrode layer is comprised of a metal.

* * * * *